UNITED STATES PATENT OFFICE.

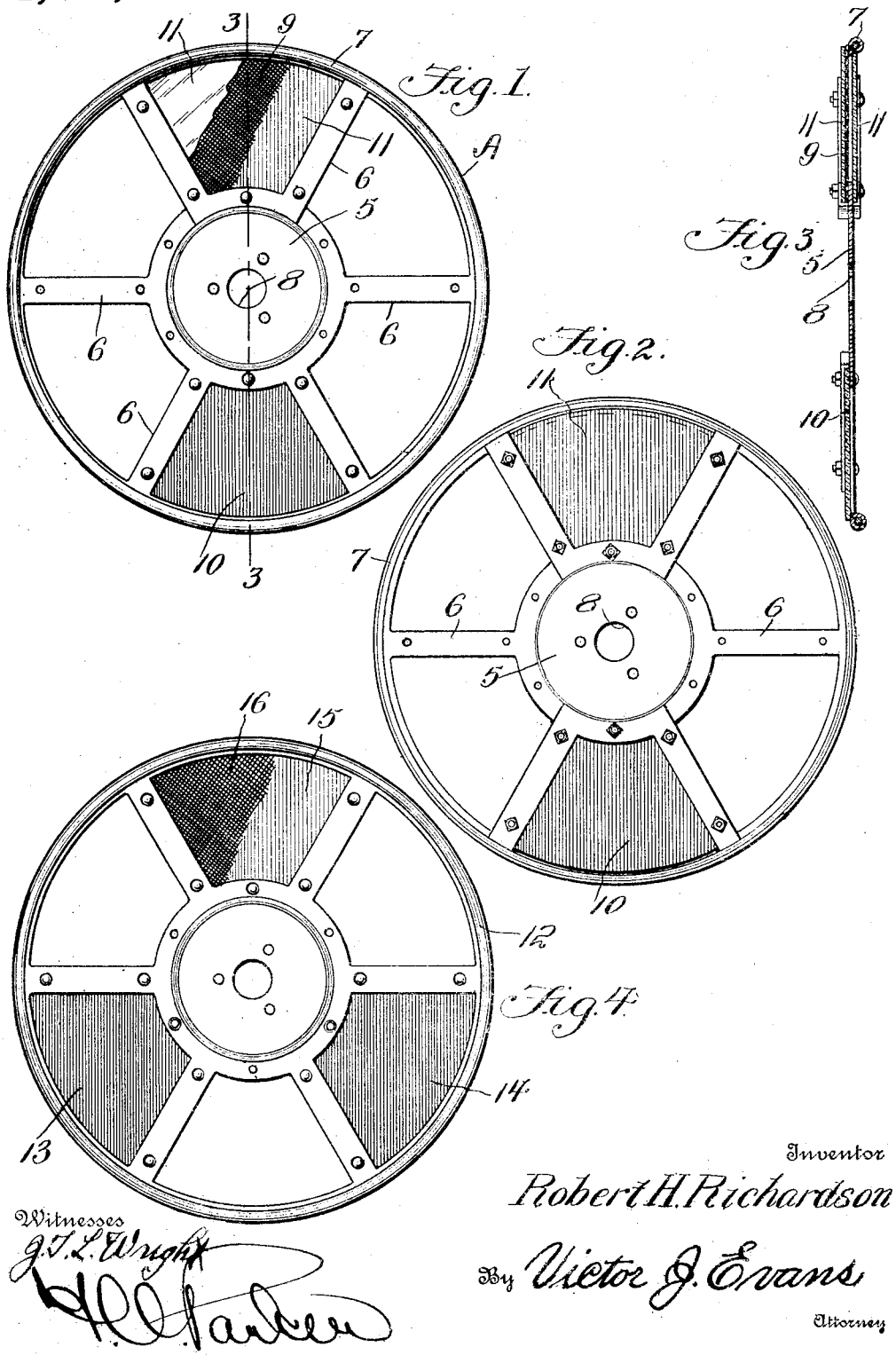

ROBERT H. RICHARDSON, OF RICHMOND, VIRGINIA.

SHUTTER.

1,245,970. Specification of Letters Patent. Patented Nov. 6, 1917.

Application filed July 17, 1916. Serial No. 109,739.

*To all whom it may concern:*

Be it known that I, ROBERT H. RICHARDSON, a citizen of the United States, residing at Richmond, in the county of Henrico and State of Virginia, have invented new and useful Improvements in Shutters, of which the following is a specification.

The invention relates to a shutter, and more particularly to the class of motion picture machine shutters.

The primary object of the invention is the provision of a shutter of this character wherein the screen on which a motion picture is projected is always partially lighted and all flicker is eliminated or so softened that when a machine is operating at the normal speed no flicker will be perceptible to the eye, thereby avoiding eye strain when viewing the picture.

Another object of the invention is the provision of a shutter of this character wherein the blades thereof are of novel construction so as to permit the picture projected upon a screen to show for greater periods per revolution of said shutter than with the shutter ordinarily used and at the same time assuring a stronger and more deeply outlined picture with greater depth of focus.

A further object of the invention is the provision of a shutter of this character wherein the construction thereof allows the same to revolve either way, that is to say, to the right or left and backwardly or forwardly, as the occasion may require, and the blades thereof will serve to bring out half tones and shadows as well as subdue high lights, thereby giving better definition to the details and finer lines and features of the photography.

A still further object of the invention is the provision of a shutter of this character wherein the construction thereof completely obscures or screens the picture from showing on the curtain or screen without cutting off entirely the light from the screen during the film movement.

A still further object of the invention is the provision of a shutter of this character wherein the solid wings or blades or the opaque ones are dispensed with and in lieu thereof a shaded glass or other transparent medium is used instead so as to subdue and tone down or to so diminish the intensity and strength of the light passing therethrough to balance and equalize said light to match that of the intercepting blade of the shutter and thereby avoid flicker and provide brilliant projection free from streaks or travel ghost.

A still further object of the invention is the provision of a shutter of this character which is simple in construction, thoroughly reliable and efficient in its purpose, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a plan view of a shutter constructed in accordance with the invention;

Fig. 2 is a view similar to Fig. 1, looking toward the opposite side thereof;

Fig. 3 is a sectional view on the line 3—3 of Fig. 1;

Fig. 4 is a plan view of a modified form of shutter.

Similar reference characters indicate corresponding parts throughout the several views of the drawing.

Referring to the drawing in detail, the shutter comprises the center disk 5, radial spokes 6 and rim 7 constituting the body A of the shutter, which is preferably stamped and cut from a single blank, although it may be made in any other manner if found desirable and inexpensive in manufacture, the disk 5 being formed with a central aperture 8 for the reception of a hub to which the shutter is fastened, whereby it may be connected with the operating shaft in the usual well known manner.

Mounted to cover one of the openings or gaps between a pair of spokes 6 adjacent to each other is a foraminous sector 9 preferably cut from fine wire mesh fabric, while diametrically opposite the wire mesh sector is a glass panel 10 which is tinted a gray color, the hue of which can be varied to render the plate translucent to the desired degree. On one or both sides of the sector 9 is arranged a glass panel sector 11, the glass panel on one side of the sector 9 being clear when both panels are used, while the glass panel on the other side is colored gray of a hue shaded to the tone of one-quarter of the first shade of gray, and in this manner these sectors 9 and 11 arranged as heretofore stated serve as an intercepting blade, while the diametrically opposed sector 10 serves as an interrupting blade in the use of the shutter with a motion picture machine. It is, of course, to be understood that this particular type of shutter as hereinbefore described is used solely with an alternating current motion picture machine, and the design as heretofore explained is different from the direct current shutter to adapt the blades in periods to alterations of the alternating current arc and cycles of this current.

In Fig. 4 there is shown a modification wherein, on the shutter body 12 which is constructed identically to the shutter body A are the three glass panels 13, 14 and 15, respectively, which are arranged proper distances apart concentrically of the center disk of said shutter body, the panels 13 and 14 being of a hue of half tone gray, while the panel 15 is of a hue of quarter tone gray. These panels 13 and 14 serve as the interrupting blades, while the panel 15 serves as the intercepting blade. Covering the panel 15 is a foraminous sector 16 preferably made from wire mesh fabric, although the same may be made from any other material having the required light penetrating qualities, it being understood that in lieu of the glass panels mica, gelatin, celluloid or any other transparent medium may be substituted. Likewise, the shutter body can be made from metal, aluminum, iron or the like.

The shutter with the three blades is employed with a direct current operated motion picture machine.

It is preferred to have the glasses, which may be the plates 13 and 14, of the same shade or tone of color or monotone, while the glass or plate 15 is of a considerably lighter shade. The use of the plates 13 and 14 provides for a substantially even illumination of the screen during the time the picture or image is projected upon the projection screen.

When it is desired to change the image as is constantly done in motion picture machines, most of the light should be cut off from the projection beam, so that when the film is shifted there will be no blurring of the image. Upon practically all of the machines in commercial use to-day, solid bladed shutters are employed, that is the shutters are formed of solid material. I provide the sector shaped openings with a tinted or colored glass that provides for an even illumination, and in one sector, as indicated in the upper portion of the several shutters shown, a lighter tinted or colored plate or glass is employed which is preferably of the same color as the plates 13 and 14, but of a lighter shade.

The construction as shown in the several figures embodies two plates indicated at 11 and 13, and interposed therebetween is the fabric which is indicated at 9 and 16, in Figs. 1 and 4 which serves to break up the rays that would form an image without producing a totally dark or shadowed period when the film is being changed or shifted.

The plate 11 may be of gray glass while the plate 15 may be of lighter tinted glass as shown in Figs. 1 and 4. The use of the lighter tinted glass in combination with the fine mesh fabric or woven material provides for a more equal diffusion of light during the so-called "shadow period" and prevents the formation of an image upon the screen, but without totally cutting off all the rays of light.

In practical use I have found that the construction as illustrated is effective and does reduce the so-called "flickering" to the minimum, which means that the operator is enabled to use a maximum amount of illumination for the image. With my device there are no abrupt changes in the intensity of the light projected upon the screen, so that the change from one projected image to another is accomplished without producing any eye strain caused by flickering, and therefore the full value of the persistence of vision is utilized.

None of the shutters with which I am acquainted, employ suitable means either by glass or by fabric to produce graduated changes in the intensity of the light, that varies from the full projection of the image to the time when the image is shifted to project the second image. Neither do the machines in commercial use employ shutters adapted to provide for graduated changes of the projected light beam which varies from the full projection to the period of film shift. Nor do they employ a tinted glass or plate interposed within the sector shaped openings producing such graduated changes.

The result obtained by my construction and assembly has been to produce a greater diffusion of light during the dark period and also to provide graduated changes.

Having thus described my invention, I claim:

1. A shutter of the character described having a plurality of panels whereof that serving as the intercepting blade is made up of a glass sheet tinted gray and overlying a sector cut from fine wire mesh.

2. A rotary shutter of the character described, one of whose panels is of glass tinted gray, and another of whose panels is of glass tinted with a lighter shade of gray, and a screen covering the last-named panel.

3. A shutter of the character described having a plurality of panels, one of which is tinted and serves as the interrupting blade, and one of which serving as the intercepting blade is made up of a clear glass sheet, a second glass sheet tinted gray, and a screen between said sheets.

4. A shutter of the character described having a plurality of panels, one of which is made up of a clear glass sheet, a second glass sheet tinted gray, and a screen between said sheets.

5. A shutter of the character described comprising sector shaped openings, certain of said sectors being unfilled or open, while certain other of the sectors are provided with translucent material having a light gray color employed as intercepting sectors for light rays, another of the sectors being provided with translucent material of a lighter shade of gray than in the others and also with a screen of fine mesh in juxtaposition thereto, said latter sector being utilized as a light intercepter to reduce and obliterate the formation of an image on the projection screen as the film is shifted.

6. A shutter of the character described having light interrupting and light intercepting sectors provided with translucent material colored gray, one of the sectors being of a lighter shade and having a fine mesh material in contact therewith, the first named sectors operating as light intercepting blades and the second named sector as a light interrupting blade, without substantial change in the actinic quality of the light rays.

7. A shutter of the character described having sector shaped openings, certain of said openings being filled with a translucent substance having a light gray color to vary the intensity of the light rays passing therethrough, another of said sectors being provided with spaced translucent substances having a screen composed of finely woven material interposed between such substances to reduce the intensity of the light rays passing through when the film is shifted and thus operating as a light interrupting sector.

8. A shutter for a motion picture machine comprising a rim and a hub having radially extending arms joining the hub to the rim, said arms forming sector shaped openings, one of said openings being filled by a fine mesh screen interposed between plates of translucent material of a light gray color to operate as a light interrupting sector without causing a totally dark period when the film is shifted, certain of the other openings being filled with plates of translucent material colored a darker shade of gray to vary the intensity and reduce the volume of light passing to the projection screen and operating to diffuse the light thus permitting the utilization of the maximum amount of light for illuminating the film.

9. A shutter for a motion picture machine formed with sector shaped openings, in certain of which there is disposed translucent material of different shades of gray operating to diffuse the illumination during the film shift and preventing the formation of an image on the projection screen, one of said sectors having in addition to its translucent material a screen having a fine mesh in contact with the material.

10. A shutter for a motion picture machine formed with sector shaped openings, in certain of which there is disposed colored translucent material of different shades operating to diffuse the illumination during the film shift and preventing the formation of an image on the projection screen, one of said sectors having in addition to its translucent material a screen having a fine mesh in contact with the material.

11. A shutter for a motion picture machine formed with sector shaped openings in certain of which there is disposed translucent material of a monotone color of varying shades operating to diffuse the illumination during the film shift and preventing the formation of an image on the projection screen, one of the sectors being provided with material of a light shade and a screen having a fine mesh in contact with the material to serve as a light interrupting blade.

12. A shutter for a motion picture machine formed with sector shaped openings in certain of which there is disposed translucent material of varying degrees of translucency operating to diffuse the illumination during the film shift and preventing the formation of an image on the projection screen, one of said sectors being provided with material of greater translucency than the others, and a screen having a fine mesh in contact with the material to serve as a light interrupting blade.

13. A shutter for motion picture machines having a portion opaque to the projection of a picture but transpicuous to the projection of light, and an equalizing portion transpicuous to both light and picture projection, neither of said portions causing any transposition of color.

In testimony whereof I affix my signature.

ROBERT H. RICHARDSON.

Copies of this patent may be obtained for five cents each, by addressing the "Commissioner of Patents, Washington, D. C."